US011989583B2

(12) United States Patent
Abernathy et al.

(10) Patent No.: US 11,989,583 B2
(45) Date of Patent: May 21, 2024

(54) CIRCUITRY AND METHOD

(71) Applicant: Arm Limited, Cambridge (GB)

(72) Inventors: Chris Abernathy, Austin, TX (US);
Eric Charles Quinnell, Austin, TX (US); Abhishek Raja, Austin, TX (US); Michael David Achenbach, Austin, TX (US)

(73) Assignee: Arm Limited, Cambridge (GB)

( * ) Notice: Subject to any disclaimer, the term of this patent is extended or adjusted under 35 U.S.C. 154(b) by 174 days.

(21) Appl. No.: 17/218,425

(22) Filed: Mar. 31, 2021

(65) Prior Publication Data

US 2022/0318051 A1 Oct. 6, 2022

(51) Int. Cl.
*G06F 9/48* (2006.01)
*G06F 9/50* (2006.01)

(52) U.S. Cl.
CPC .............. *G06F 9/4881* (2013.01); *G06F 9/48* (2013.01); *G06F 9/4843* (2013.01); *G06F 9/50* (2013.01);
(Continued)

(58) Field of Classification Search
CPC ........ G06F 9/48; G06F 9/4843; G06F 9/4881; G06F 9/50; G06F 9/5005; G06F 9/5027; G06F 9/5033; G06F 9/5038
See application file for complete search history.

(56) References Cited

U.S. PATENT DOCUMENTS

| | | | |
|---|---|---|---|
| 6,728,866 B1* | 4/2004 | Kahle ................... | G06F 9/3891 712/217 |
| 2012/0023314 A1* | 1/2012 | Crum .................... | G06F 9/3838 712/216 |

(Continued)

*Primary Examiner* — Charles M Swift
(74) *Attorney, Agent, or Firm* — NIXON & VANDERHYE P.C.

(57) ABSTRACT

Circuitry comprises two or more clusters of execution units, each cluster comprising one or more execution units to execute processing instructions; and scheduler circuitry to maintain one or more queues of processing instructions, the scheduler circuitry comprising picker circuitry to select a queued processing instruction for issue to an execution unit of one of the clusters of execution units for execution; in which: the scheduler circuitry is configured to maintain dependency data associated with each queued processing instruction, the dependency data for a queued processing instruction indicating any source operands which are required to be available for use in execution of that queued processing instruction and to inhibit issue of that queued processing instruction until all of the required source operands for that queued processing instruction are available and is configured to be responsive to an indication to the scheduler circuitry of the availability of the given operand as a source operand for use in execution of queued processing instructions; and the scheduler circuitry is responsive to an indication of availability of one or more last awaited source operands for a given queued processing instruction, to inhibit issue by the scheduler circuitry of the given queued processing instruction to an execution unit in a cluster of execution units other than a cluster of execution units containing an execution unit which generated at least one of those last awaited source operands.

17 Claims, 6 Drawing Sheets

(52) U.S. Cl.
CPC .......... *G06F 9/5005* (2013.01); *G06F 9/5027* (2013.01); *G06F 9/5033* (2013.01); *G06F 9/5038* (2013.01)

(56) References Cited

U.S. PATENT DOCUMENTS

| | | | |
|---|---|---|---|
| 2013/0179886 A1* | 7/2013 | Frazier | G06F 21/6218 |
| | | | 718/100 |
| 2017/0031728 A1* | 2/2017 | Zhao | G06F 9/52 |
| 2017/0249191 A1* | 8/2017 | Chang | G06F 9/5038 |
| 2019/0095214 A1* | 3/2019 | Altevogt | G06F 9/3838 |
| 2019/0196840 A1* | 6/2019 | Han | G06F 9/3885 |
| 2019/0362460 A1* | 11/2019 | Maiyuran | G06F 9/30087 |
| 2020/0162397 A1* | 5/2020 | Levi | H04L 12/1877 |

\* cited by examiner

(execution by same cluster)

| Clock cycle | 1 | 2 | 3 | 4 |
|---|---|---|---|---|
| Queue | B(A), C(B) | C(B) | | |
| Execute | A | B | C | ... |
| Writeback by regfile | | | | |

Fig. 3

(execution by different clusters)

| Clock cycle | 1 | 2 | 3 | 4 | 5 |
|---|---|---|---|---|---|
| Queue | B(A), C(B) | B(A) C(B) | C(B) | C(B) | |
| Execute | A | | B | | C |
| Writeback by regfile | | A | | B | |

CIRCUITRY AND METHOD

BACKGROUND

This disclosure relates to circuitry and methods.

Data processing circuitry can be implemented as so-called clusters of execution units. An output generated by one of the execution units executing a processing instruction can be provided as an input operand to support execution of a processing instruction by that or another one of the execution units.

SUMMARY

In an example arrangement there is provided circuitry comprising:

two or more clusters of execution units, each cluster comprising one or more execution units to execute processing instructions; and scheduler circuitry to maintain one or more queues of processing instructions, the scheduler circuitry comprising picker circuitry to select a queued processing instruction for issue to an execution unit of one of the clusters of execution units for execution;

in which:

the scheduler circuitry is configured to maintain dependency data associated with each queued processing instruction, the dependency data for a queued processing instruction indicating any source operands which are required to be available for use in execution of that queued processing instruction and to inhibit issue of that queued processing instruction until all of the required source operands for that queued processing instruction are available and is configured to be responsive to an indication to the scheduler circuitry of the availability of the given operand as a source operand for use in execution of queued processing instructions; and the scheduler circuitry is responsive to an indication of availability of one or more last awaited source operands for a given queued processing instruction, to inhibit issue by the scheduler circuitry of the given queued processing instruction to an execution unit in a cluster of execution units other than a cluster of execution units containing an execution unit which generated at least one of those last awaited source operands.

In another example arrangement there is provided a method comprising:

maintaining one or more queues of processing instructions;

selecting a queued processing instruction for issue to an execution unit of one of two or more clusters of execution units for execution;

maintaining dependency data associated with each queued processing instruction, the dependency data for a queued processing instruction indicating any source operands which are required to be available for use in execution of that queued processing instruction;

inhibiting issue of that queued processing instruction until all of the required source operands for that queued processing instruction are available;

providing an indication of the availability of the given operand as a source operand for use in execution of queued processing instructions; and in response to an indication of availability of one or more last awaited source operands for a given queued processing instruction, inhibiting issue of the given queued processing instruction to an execution unit in a cluster of execution units other than a cluster of execution units containing an execution unit which generated those last awaited source operands.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Example Processing Circuitry

Figure 1:
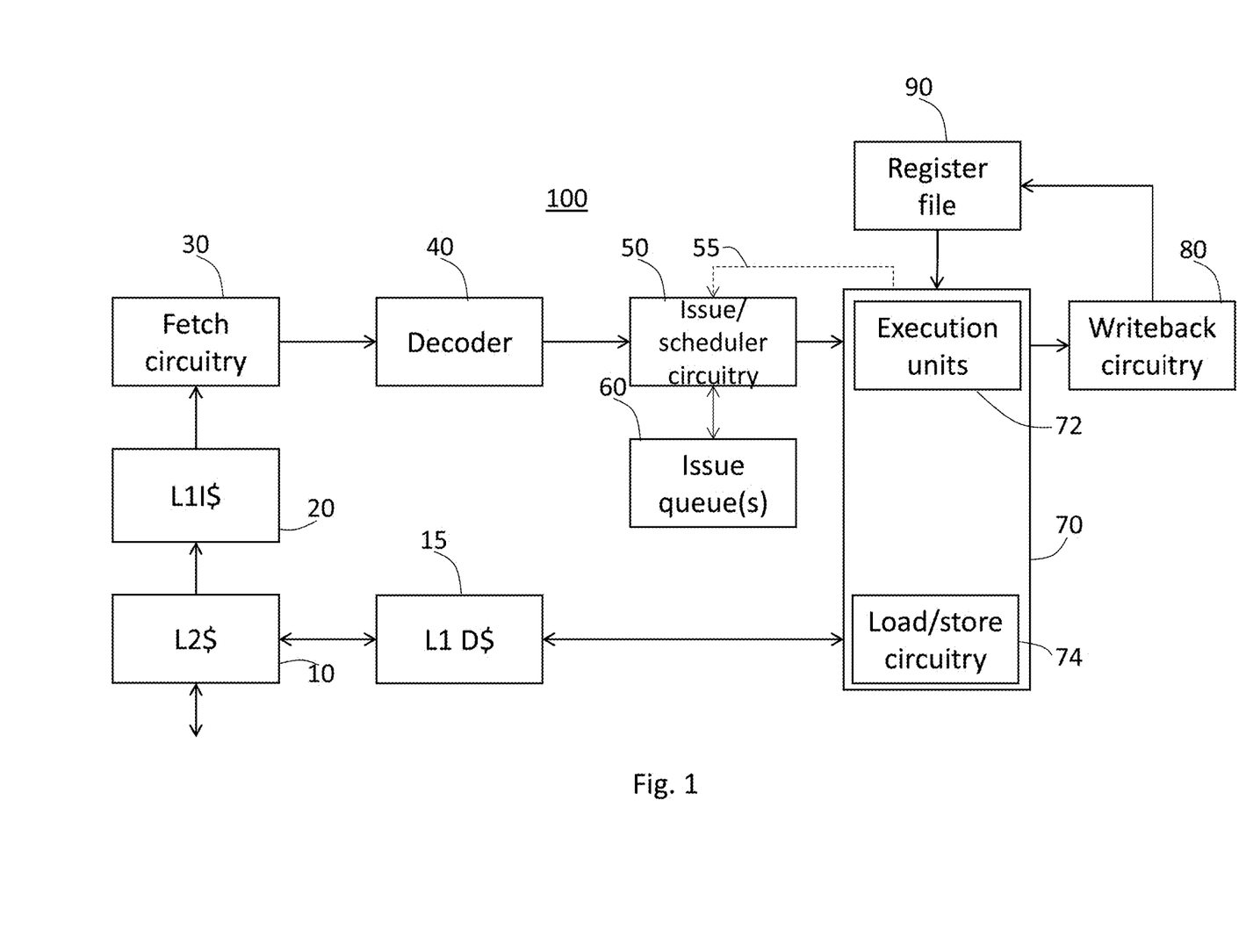
FIG. 1 schematically illustrates an example processing circuitry.

FIG. 1 is a schematic diagram illustrating an example 100 of processing circuitry. Referring to FIG. 1, a level 2 cache 10 interfaces with a memory system (not shown). A level 1 instruction cache 20 provides a more localised cache of processing instructions and a level 1 data cache 15 provides a more localised cache of data to be retrieved from or stored to the memory system.

Fetch circuitry 30 fetches program instructions from the memory system via the various caches as drawn and provide fetched program instructions to decoder circuitry 40. The decoder circuitry 40 decodes the fetched program instructions and generates control signals to control a processing unit 70 to perform processing operations.

The decoded instructions are provided to issue/scheduler circuitry 50 which maintains one or more issue queues 60 holding instructions awaiting issued to the processing unit 70. As part of its operation, the issue/scheduler circuitry holds instructions in an issue queue until at least the stage at which all of the source operands required for execution of an instruction are ready which is to say they have been generated by the execution of earlier-executed instructions.

Note that the issue/scheduler circuitry 50 shown in FIG. 1 relates to an example (described here by way of introduction to the techniques to be discussed below) of a single processing circuitry. In the examples discussed below, scheduling and issue takes place as between multiple clusters of execution units or processing circuitries, and common issue/scheduler circuitry applicable to such arrangements is capable (at least in principle) of issuing instructions to any of the clusters.

The availability of results for use as source operands is communicated (in this example) by the processing unit 70 to the issue/scheduler circuitry 50, for example by a schematic data path 55. More generally, in a clustered arrangement discussed below, such an indication of availability could be generated by issue/scheduler circuitry responsible for issuing a "producer" instruction (an instruction generating a result for use as a source operand by a "consumer" instruction, and described in more detail below) and broadcast to all instances of issue/scheduler circuitry. Therefore, the schematic data path 55 may originate with one or more processing circuitries, or with one or more instances or portions of issue/scheduler circuitry but serves the purpose of informing the issue/scheduler circuitry 50 of the availability (or the impending availability in a pipelined system) of a particular result which may be required for use as a source operand by a queued instruction.

In general terms, in these examples, one of (i) the scheduler circuitry and (ii) an execution unit generating the given operand may be configured to provide the indication of the availability of the given operand as a source operand for use in execution of queued processing instructions.

The processing unit 70 may comprise various components, only two of which are shown in FIG. 1 for clarity of the diagram, namely a set of execution units 72 and load/store circuitry 74 which communicates with the level I data cache 15 to retrieve source data and to store results generated by the processing unit 70.

One technique for communicating between execution units, which will be described in further detail below, is to use a register file 90, written to by writeback circuitry 80 in response to generation of a result by one of the execution unit 72 and which can be read by one of the execution units 72.

Clustering of Execution Units

In processing circuitry such as circuitry intended to perform high-throughput data processing, one approach is to provide multiple execution units 232 (FIG. 2), for example comprising one or more execution stages configured to operate according to successive execution clock cycles.

Communication between the execution units may be by a direct connection or first data path or via one or more processor registers configured to store operands generated by an execution unit (such as the register file 90) as a second data path. In some examples, the second data path latency is longer than the first data path latency.

This communication is relevant to the execution of so-called consumer micro-operations (uops) decoded from program instructions by the decoder circuitry 40. Here, the term "consumer" refers to the nature of these uops in that they can require, as source operands, one or more results generated by other "producer" uops. In general terms, a consumer uop cannot complete execution until all of its required source operands have been generated or provided by the relevant producer uop(s). To accommodate this dependency, the issue/scheduler circuitry 50 is configured to maintain dependency data associated with each queued processing instruction, the dependency data for a queued processing instruction indicating any source operands which are required to be available for use in execution of that queued processing instruction and to inhibit (or indeed prevent) issue of that queued processing instruction until all of the required source operands for that queued processing instruction are available. The use of such dependency data will be discussed in more detail with respect to FIG. 5 below.

To mitigate this higher latency, an example approach could be to provide a direct connection or first data path between the output of each execution unit and the input of every other execution unit, so as to avoid the need for transferring data between execution units via the register file 90. However, as such a design of processing circuitry grows larger, each additional execution unit adds exponentially to the network wiring and so-called logic fanouts required to implement the first data path. This can reach a level of complexity which eventually results in a net degradation of physical timing and performance.

Figure 2:
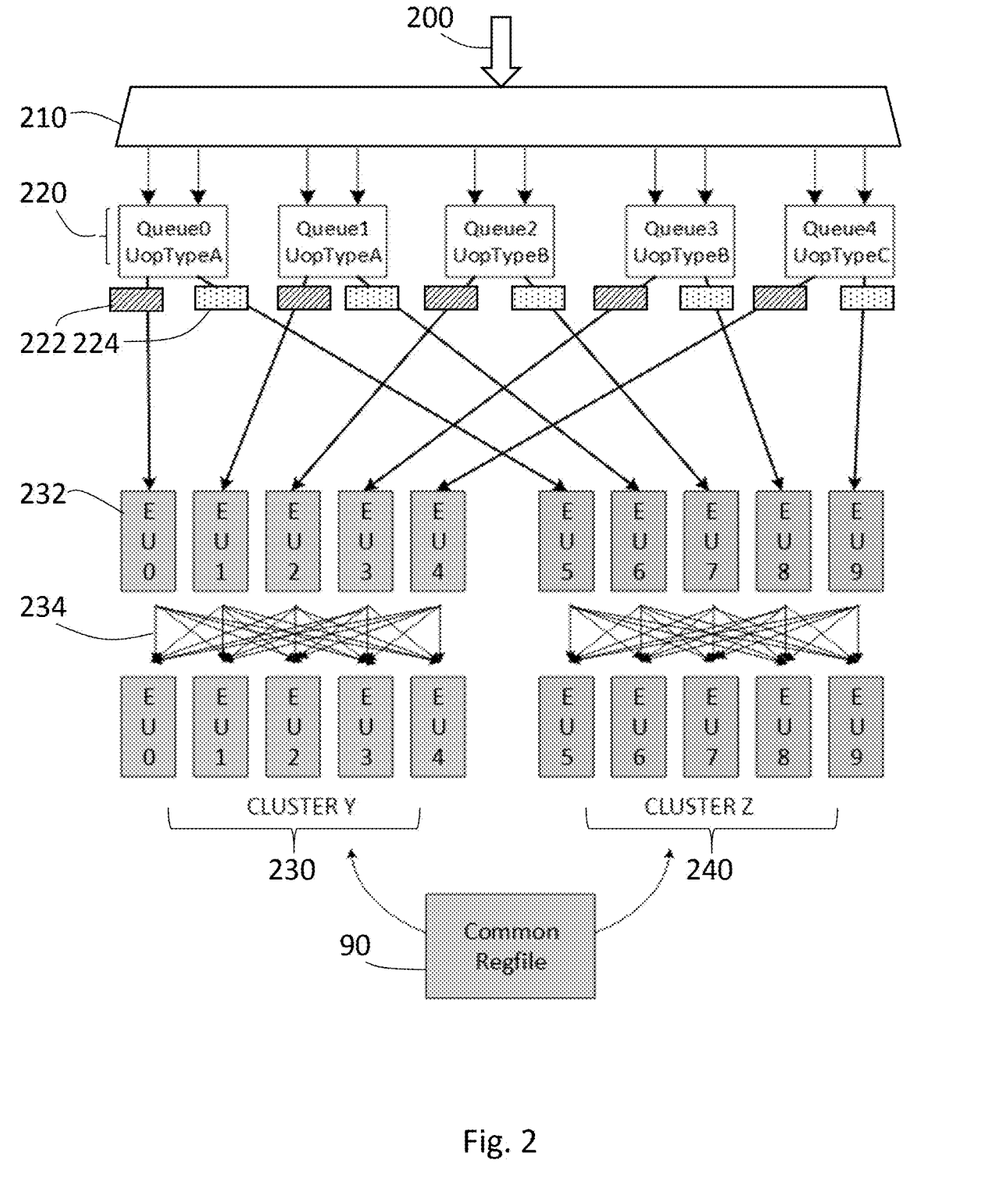
FIG. 2 schematically illustrates the use of clusters of execution units.

Therefore, in the example of FIG. 2, the execution units are grouped into physical placement clusters 230, 240, with the provision of a first data path being applicable to local connections within a particular cluster. Transfer of data between clusters is handled via the register file 90.

The example of FIG. 2 shows two clusters 230 (cluster Y) and 240 (cluster Z). In other examples, different numbers of clusters (at least two) may be used. In the example of FIG. 2, each cluster comprises five execution units but this is just for simplicity of the illustration and in fact various numbers of execution units (at least one in each case) may be used. In general, embodiments of the present disclosure envisage that each cluster could comprise just one execution unit, or at least some of the clusters (for example, in a range from a subset of one or more clusters through to all of the clusters) could comprise two or more execution units.

In FIG. 2, instructions to be queued such as uops are received 200 by a schematic demultiplexer 210 and are provided to respective instruction queues, for example according to their uop type. This allows the routing of uops to dedicated execution units in dependence upon the type of the uop. For example, a uop type may be a load/store operation and the corresponding dedicated execution unit may provide functionality of the load/store circuitry 74. In another example, a uop type may be a division operation and the corresponding dedicated execution unit may provide division functionality. In the example of FIG. 2, one instruction queue (Queue0) handles uops of a particular type (TypeA), which are, when issued, routed to execution units EU0 (in cluster Y) or EU5 (in cluster Z). Note that in the example shown, another queue (Queue1) also handles uops of TypeA but is arranged to route its queued uops to execution units EU1 and EU6. Two further queues (Queue2 and Queue3) handle uops of TypeB and a further queue (Queue4) handles uops of TypeC. Note that it is not necessary that any given type of the set of uop types listed is confined to a specific uop instruction such as a divide operation. In fact, one or more of the types could encompass a range or set of instructions or, in other examples, could encompass "all uops not of any other specific type for which a respective queue is provided".

Regarding the implementation of issue/scheduler circuitry 50 in this arrangement, so-called picker circuitry 222, 224 is provided for each of the instruction queues 220. The circuitries 222, 224 are represented by different styles of shading in FIG. 2 for clarity. In fact, respective picker circuitry (or at least circuitry providing respective picker functionality) is provided for each of the clusters 230, 240. So, for an example instruction queue such as Queue0, there exists picker functionality 222 which provides instructions from Queue( ) to cluster Y 230 and picker functionality 224 which provides instructions from Queue( ) to cluster Z 240. Therefore, subject to considerations and potential constraints discussed below, any instruction held by Queue( ) can be picked and provided to either of the clusters 230, 240 for execution.

Although the circuitries 220, 222, 224 may collectively be considered as issue/scheduler circuitry, it is also useful to consider them as separate instances of issue/scheduler circuitry such that a single instance of issue/scheduler circuitry (for example, that part of the circuitry being associated with one of the queues 220 of FIG. 2) which is responsible for issuing a given producer uop is also responsible for broadcasting an indication to all of the issue/scheduler circuitry indicating that the results of that uop are or will be available for use as source operand(s) by consumer uops.

Data Transfer Latency

In the example of FIG. 2, each given cluster 230, 240 of execution units comprises a first data path 234 (direct connections between execution units within that cluster) configured to transfer an operand generated by an execution unit of that cluster during a given clock cycle to an input of all execution units of the given cluster of execution units, the first data path having a first data path latency between generation of the operand and completion of transfer of the operand to the input of all execution units of the given cluster. For example, the first data path latency may be such that an execution unit of the given cluster may execute a processing instruction requiring an operand transferred by the first data path during a next following clock cycle after the given clock cycle.

Figure 3:
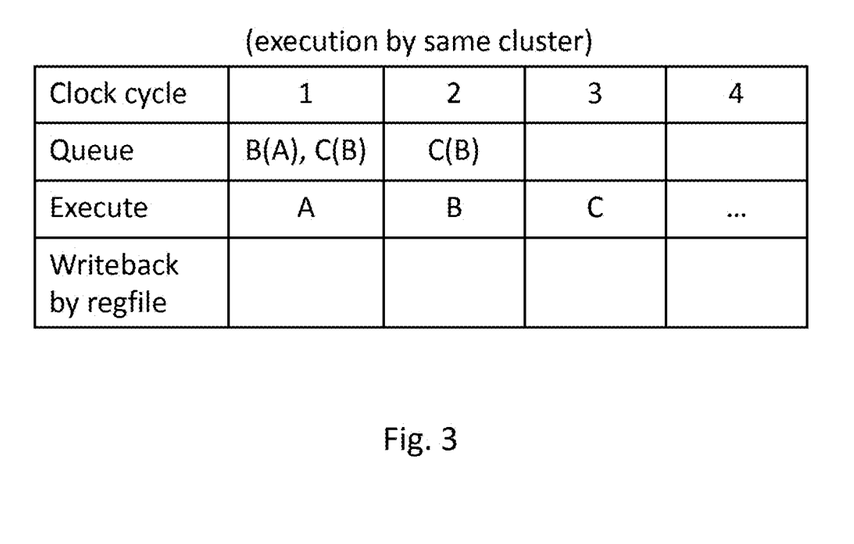
FIGS. 3 and 4 schematically illustrate pipelining operations.

An example situation is shown in FIG. 3, which illustrates, for each of four arbitrary successive clock cycles 1 . . . 4 a set of queued instructions, instructions being executed and writeback operations via the register file 90.

In a first clock cycle 1, instruction A is being executed and the queue holds instruction B, which depends upon the results of instruction A and instruction C which depends upon the results of instruction B.

In the example of FIG. 3, execution is all within the same cluster so that the first data path or direct connection is used to transfer the results of instruction execution for use as source operand(s) by subsequently-executed instructions. Therefore, in the next clock cycle 2, the instruction B can be executed; in the next clock cycle 3, the instruction C can be executed and so on.

Similarly, in the example of FIG. 2, the two or more clusters of execution units comprise a second data path (via the register file 90) configured to transfer an operand generated by an execution unit during a given clock cycle to an input of all execution units of the two or more clusters of execution units, the second data path having a second data path latency between generation of the operand and completion of transfer of the operand to the input of all execution units of the two or more clusters of execution units. For example, the second data path latency may be such that an execution unit of the given cluster may execute a processing instruction requiring an operand transferred by the second data path no earlier than at least two clock cycles after the given clock cycle.

Figure 4:
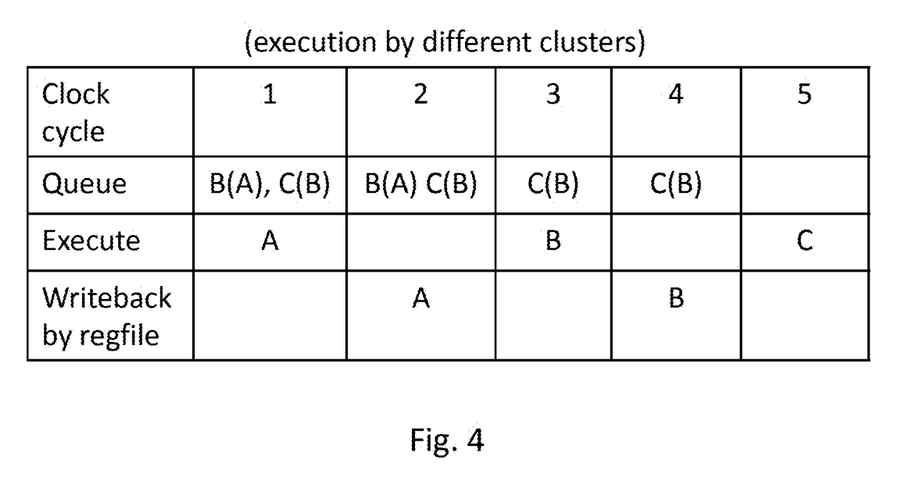

FIG. 4 schematically illustrates an example using the second data path which, in this example, defines a one-cycle latency for the communication of execution results via the register file 90 for use as source operand(s) for subsequently-executed instructions. Once again, in a first clock cycle 1, instruction A is executed while instructions B and C are queued. Transfer of the results of the instruction A via the register file 90 is not completed until the end of clock cycle 2 and so execution of instruction B cannot be performed until the clock cycle 3. Similarly, execution of instruction C (which depends upon the results of instruction B being transferred via the register file 90) cannot be performed until the clock cycle 5.

Techniques to be described below can at least partially mitigate the higher latency of the second data path by allowing potentially greater use of the first data path.

In example arrangements, the picker circuitry (as an example of suitable functionality associated with each cluster of execution units) may select as a fundamental priority the oldest not-yet-executed consumer uop in a respective queue that has its final remaining one or more dependent producer results completing that cycle and from that cluster. In the case that the consumer uop's final source input is generated by a producer executed by a different cluster, the consumer uop is (at least temporarily) excluded from selection such that it cannot be selected by that picker circuitry until at least the expiry of a penalty latency to allow time for the source data to arrive at the shared or common register file.

In the situation that the picker circuitry associated with a cluster has no available consumer uops with their final source ready from the same local cluster, it can instead pick the oldest "ready" uop that has all of its inputs available at the shared or comment register file 90.

As a third (optional) strand of this set of techniques, to avoid multiple pickers defaulting to exactly the same oldest ready uop having its sources available in the register file 90, a mask can be applied to a subset of the pickers which excludes the oldest ready consumer uop having its sources in the register file 90, which would be picked by a default condition at another picker.

This picking arrangement can therefore: (i) potentially reduce dependent execution latency by selecting consumer uops for execution by the same cluster that executed the one or more last remaining producer uop(s); (ii) selecting the oldest available consumer uops having their sources in the register file 90; and (iii) employing a mask such as a pre-calculated or other mask to inhibit or disqualify the default oldest common source ready uop that would be a possible default selection by another cluster picker.

Issue/Scheduler Circuitry Example

Figure 5:
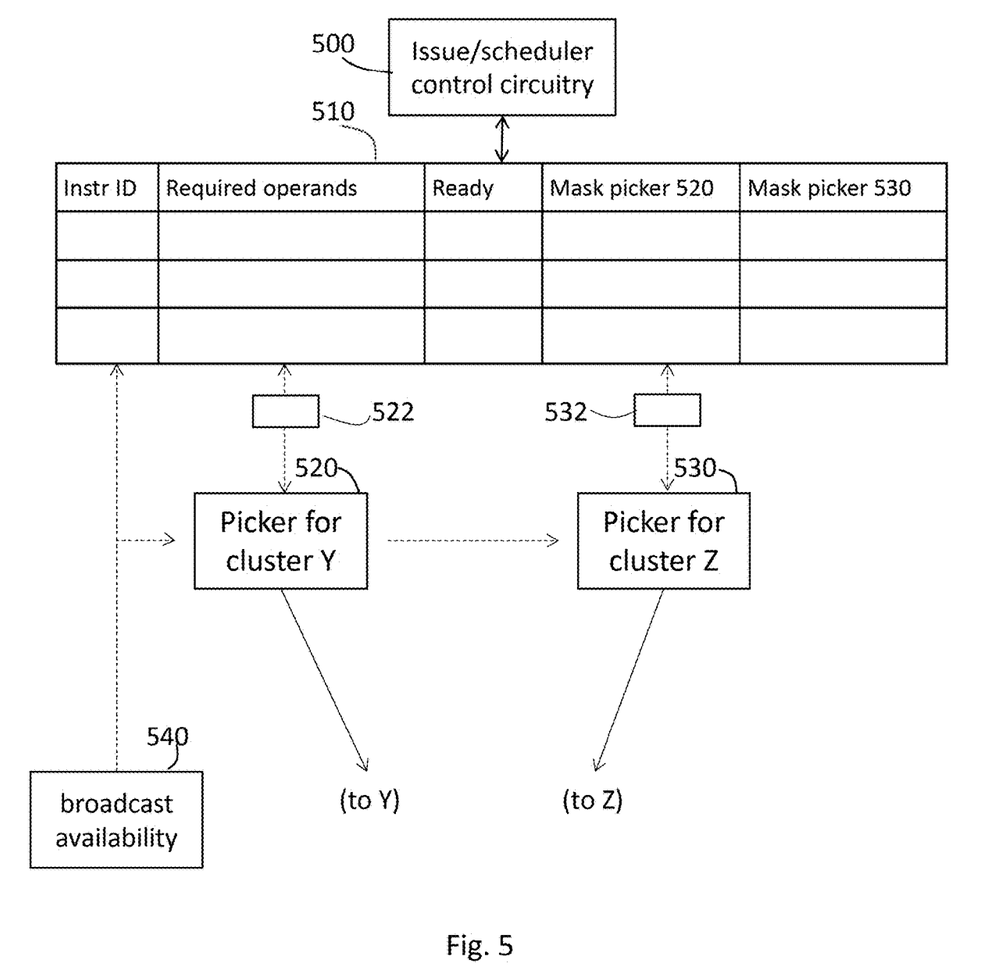
FIG. 5 schematically illustrate a scheduling operation.

Referring now to FIG. 5, an example is shown of one instance 510 of issue/scheduler circuitry comprising one of the issue queues 220 of FIG. 2, along with a respective example 520, 530 of the pickers 222, 224 applicable to the clusters Y and Z respectively. As discussed above, the queue 510 is accessible by either picker 520, 530 so that, subject to any constraints to be discussed below, either picker 520, 530 may pick or select a queued instruction and provided to an execution unit in that picker's respective cluster for execution.

In general terms the issue circuitry 50 comprises scheduler circuitry to maintain one or more queues of processing instructions, the scheduler circuitry comprising picker circuitry to select a queued processing instruction for issue to an execution unit of one of the clusters of execution units for execution.

Note that as mentioned before, there may be more than two clusters, in which case there would be a corresponding number of pickers each capable of accessing any instruction held by the queue 510. The present example as drawn concerns two clusters of execution units, each cluster comprising two or more execution units to execute processing instructions, and two pickers for clarity of the description. However, as noted above, one or more of the clusters could have just one execution unit.

Each queue entry is represented by a horizontal row in the representation of FIG. 5. An instruction held by the queue is identified by an instruction identifier (instr ID) field and is associated with a set of zero or more required operands. A "ready" indication (for example provided by one or more flops) indicates whether or not all of the required operands have either been prepared already or will become available as execution results during the current cycle. Mask fields applicable to each of the pickers 520, 530 will be discussed below.

A generic indication is shown as a block 540 to illustrate the broadcast by an instance of issue/scheduling circuitry responsible for the issue of a producer uop (or in other examples an execution unit executing such a producer uop) of information indicating operands which are now becoming available as a result of execution of that producer uop. This information is used by issue/scheduler control circuitry 500 (forming part of the issue circuitry 50) to detect whether to set the "ready" indication for any of the queued instructions.

It may be that a particular operand generated by execution of a producer uop is required by a queued uop but that uop still requires other, as-yet unavailable, source operands. In such a case, the "ready" indication is not set to indicate "ready" for that queued uop. For the purposes of the discussion below, the operand just generated by execution of that producer uop is not considered as a "last awaited source operand" for that particular queued uop, because the queued uop still awaits one or more other operands.

On the other hand, it may be the case that a particular operand generated by execution of a producer uop is in fact a last awaited source operand for a particular queued uop. In this case, the "ready" indication is set to indicate that the queued operand is ready for issue for execution. Note that in a given cycle, it may be that a queued operand which was awaiting two or more source operands becomes ready by virtue of all of those two or more last awaited source operands becoming available in the given cycle. This could be by virtue of those two or more operands being generated by a single producer instruction or by multiple producer instructions, for example executing by the same cluster. In some examples, the situation which could apply if a given queued instruction had its last two source operands made available by different clusters could be that the given queued instruction would not be eligible for pick that cycle for data forwarding by first data path. Each picker would need to wait for an extra cycle for the other source that will only be available via the register file (second data path).

In general terms, the issue/scheduler circuitry is configured to be responsive to an indication to the scheduler circuitry of the availability of the given operand as a source operand for use in execution of queued processing instructions.

Therefore, issue of a queued instruction is inhibited (for example prevented) until the "ready" indication is set, which in turn is not set until an indication has been received (based on the execution of producer instructions) that all of the source operands for the queued instruction are either available or will become available during the current processing cycle.

In other words, the scheduler circuitry is configured to associate readiness data, indicating readiness for issue, with a queued processing instruction for which all of the source operands are available, the instruction picker circuitry being configured to select a queued processing instruction for which the readiness data indicates readiness for issue.

Once an instruction has been picked and issued, it is removed from the instruction queue.

Routing of Issued Instructions

In general terms, the scheduler circuitry is responsive to an indication of availability of one or more last awaited source operands for a given queued processing instruction, to inhibit issue by the scheduler circuitry of the given queued processing instruction to an execution unit in a cluster of execution units other than a cluster of execution units containing an execution unit which generated at least one of those last awaited source operands. For example, the scheduler circuitry may comprise respective instruction picker circuitry to select queued processing instructions for issue to execution units of the two or more clusters of execution units.

As discussed above, this inhibition of issued to "another" cluster can be achieved by various techniques which may be used individually or in combination.

In some examples, the picker circuitries 520, 530 may be constrained so as never to pick (for issue to its respective cluster) a queued instruction for which the one or more last awaited operands were generated by a different cluster. This constraint can be implemented by the picker circuitry being responsive to the indications from the issue/scheduler control circuitry 500 and/or the issue queue 510 in conjunction with the broadcast availability from the execution units. In examples, a picker 520, 530 may be "woken up" by the issue/scheduler control circuitry 500 in respect of a queued instruction when that instruction becomes ready, such that only the picker corresponding to the cluster from which the last awaited operand(s) were made available is initially woken up.

For example, the "ready" indication can be gated, for example by gating circuitry 522, 532 respectively (which is shown schematically as separate circuitry for clarity of the present explanation, but which in practical implementations could be incorporated within the issue/scheduler control circuitry 500). The gating circuitry may be responsive, for example, to the mask data fields.

The mask data may be set to hold a control bit which, when set to a first bit value, causes the gating circuitry to inhibit the ready indication from being provided to wake up that respective picker, but when set to a second bit value allows the ready indication to be provided to that picker. The mask data field may be arranged to hold the control bit at the first bit value for one cycle (or more generally, a number of cycles equal to the difference between the latency of the second data path and the first data path). The mask data may be set to the first bit value in respect of all pickers capable of picking a particular consumer uop other than the picker for the respective cluster which generated the one or more last remaining operands for that consumer uop.

This provides an example in which the scheduler circuitry is configured to inhibit issue of the given queued processing instruction to an execution unit in a cluster of execution units other than the cluster of execution units containing the execution unit which generated that last awaited one of the source operands, until at least a predetermined non-zero number of clock cycles after receipt of the indication of availability of that last awaited one of the source operands.

The gating of the ready indication can therefore inhibit the instruction picker circuitry associated with a cluster of execution units other than the cluster of execution units containing the execution unit which generated the last awaited one of the source operands from detecting the readiness data for the given queued processing instruction.

By this technique, the picker for the cluster which generated the one or more last remaining operands is woken up and is capable of picking that consumer uop to be executed in the next cycle following the availability of the one or more last remaining operands. This corresponds to the situation shown in FIG. 3, for example when the instruction B is executed in the next cycle following the generation of its last remaining operands by the instruction A. Note that for clarity of the diagram an indication of the dependency upon instruction A is shown rather than listing particular operands which are awaited. On the other hand, any other picker for a different cluster is not even woken up so as to be capable of picking that consumer uop until one cycle later. By this time, the consumer uop may of course have been issued by the other picker which received an earlier ready indication for that consumer uop. However, if the instruction still awaits issue, then the additional delay in waking up one of the other pickers implies that the source operands will now be available via the longer latency second data path, which is to say via the register file 90.

It may be that more than one queued instruction is available for picking by a given picker. In these circumstances the picker may use an arbitration scheme to decide which one to pick. For example, the picker may be configured to select a longest-queued or oldest processing instruction for which the readiness data indicates readiness for issue. However, other arbitration schemes can be used such as a round-robin scheme.

Mask Examples

The mask fields of FIG. 5 will now be discussed.

In some examples, the mask fields can be used to control the gating or availability of ready indications to individual pickers. For example, the mask fields may contain one bit for each applicable picker, with that bit being settable to a particular value to inhibit provision of the ready indication to that picker.

The mask fields can contain pre-calculated information which, in effect, can disqualify or prevent a particular picker from picking a given uop for which the last remaining operands were provided by the register file 90 (the second data path). This can be performed where such a uop would be a possible default selection by another cluster picker.

Therefore, in some examples, the scheduler circuitry can be configured to generate a data mask to inhibit detection that the given queued processing instruction is ready for issue to an execution unit in a cluster of execution units other than the cluster of execution units containing the execution unit which generated that last awaited one of the source operands.

The mask data can be pre-computed and left in place so as to inhibit picking by a particular picker of a given queued instruction.

In other examples, as discussed above, the mask data can be transient, so that for example it can be removed a predetermined number of clock cycles after generation of the last awaited one of the source operands. This can provide the functionality of deferring the opportunity for a picker other than the picker corresponding to the "same cluster" to select a newly ready queued instruction.

As an example of transient mask data, a mask can be generated (for example by the issue/scheduler control circuitry 500) in that the circuitry generating the mask detects the oldest or longest-queued instruction with all its sources ready and applies a mask to exclude that instruction from one of the pickers (in a two-picker arrangement) or from all but one of the pickers (more generally), so that the (masked) picker then picks its second oldest instruction. The other picker will pick the oldest instruction, thereby avoiding a picking collision. This provides a further example in which the scheduler circuitry is configured to generate a data mask to inhibit detection that the given queued processing instruction is ready for issue to an execution unit in a cluster of execution units other than the cluster of execution units containing the execution unit which generated that last awaited one of the source operands.

Flowchart Examples

Figure 6:
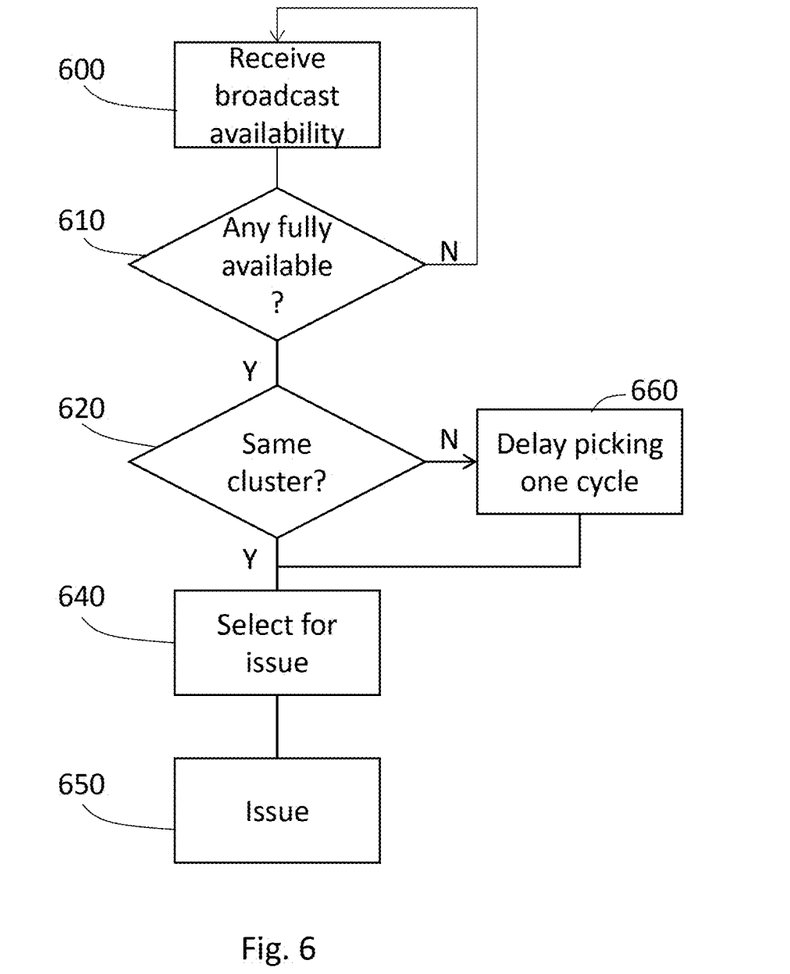
FIGS. 6 and 7 are schematic flowcharts illustrating respective methods.

FIG. 6 is a schematic flowchart representing some aspects of the processes discussed above. The flowchart represents steps performed by the issue/scheduler circuitry 50 including the picker circuitry as shown in FIG. 5.

At a step 600, broadcast availability of one or more processing results generated by producer instructions is received. At a step 610, if all of the source operands for any of the queued instructions are available then control passes to a step 620. Otherwise, control returns to the step 600 to await the next broadcast availability.

Referring to the picking operation, at the step 620, if the one or more last operands were generated by the same cluster that a particular picker would route a newly ready instruction to, then the instruction can be selected for issue by that picker at a step 640 and issued at a step 650. If not the same cluster then at a step 660, picking by that picker is deferred for one cycle (or, more generally, the difference in latency between the second data path and the first data path).

Method

Figure 7:
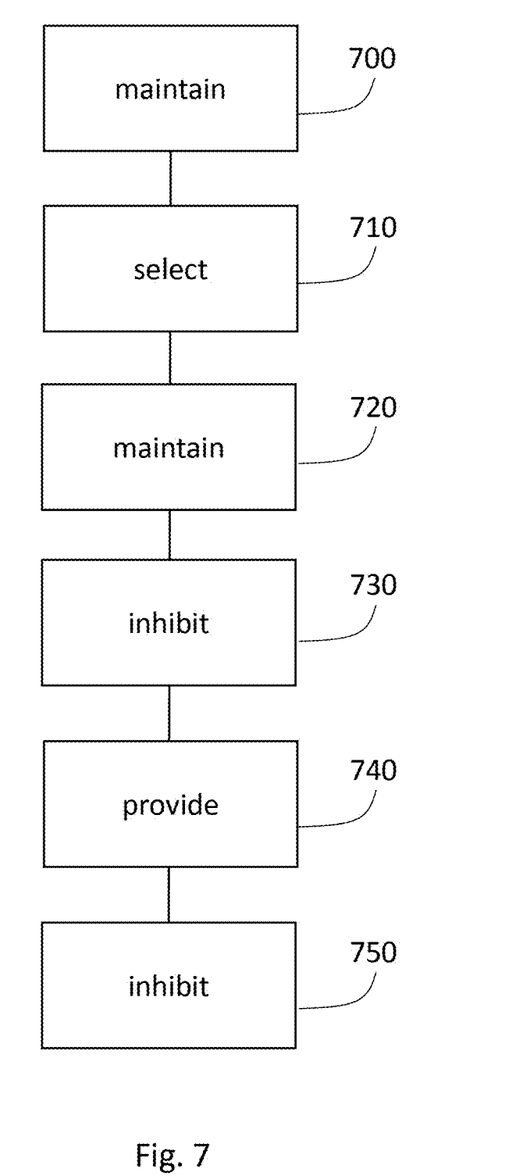

By way of summary of the techniques discussed above, FIG. 7 is a schematic flowchart illustrating a method (which can, for example, be implemented by the circuitry described above) comprising:
  maintaining (at a step 700) one or more queues of processing instructions;
  selecting (at a step 710) a queued processing instruction for issue to an execution unit of one of two or more clusters of execution units for execution;
  maintaining (at a step 720) dependency data associated with each queued processing instruction, the dependency data for a queued processing instruction indicating any source operands which are required to be available for use in execution of that queued processing instruction;
  inhibiting (at a step 730) issue of that queued processing instruction until all of the required source operands for that queued processing instruction are available;
  providing (at a step 740) an indication of the availability of the given operand as a source operand for use in execution of queued processing instructions; and
  in response to an indication of availability of one or more last awaited source operands for a given queued processing instruction, inhibiting (at a step 750) issue of the given queued processing instruction to an execution unit in a cluster of execution units other than a cluster of execution units containing an execution unit which generated those last awaited source operands.

GENERAL MATTERS

In the present application, the words "configured to . . . " are used to mean that an element of an apparatus has a configuration able to carry out the defined operation. In this context, a "configuration" means an arrangement or manner of interconnection of hardware or software.

For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Circuitry comprising:

two or more clusters of execution units, each cluster comprising one or more execution units to execute processing instructions; and scheduler circuitry to maintain two or more queues of processing instructions, the scheduler circuitry comprising picker circuitry to:

select, from a respective queue of the two or more queues, respective queued processing instructions for issue to execution units of the two or more clusters of execution units; and select, from another respective queue of the two or more queues, respective queued processing instructions for issue to execution units of the two or more clusters of execution units, in which:

the scheduler circuitry is configured to maintain dependency data associated with each queued processing instruction, the dependency data for a queued processing instruction indicating any source operands which are required to be available for use in execution of that queued processing instruction and to inhibit issue of that queued processing instruction until all of the required source operands for that queued processing instruction are available and is configured to be responsive to an indication of the availability of a given operand as a source operand for use in execution of queued processing instructions;

the scheduler circuitry is responsive to an indication of availability of one or more last awaited source operands for a given queued processing instruction, to inhibit for at least one clock cycle selection by the picker circuitry of the given queued processing instruction for issue to an execution unit in a cluster of the two or more clusters of execution units other than a cluster of the two or more clusters of execution units containing an execution unit which generated at least one of those last awaited source operands;

the scheduler circuitry is responsive to completion of the at least one clock cycle to enable selection by the picker circuitry of the given queued processing instruction for issue to the execution unit in the cluster of the two or more clusters of execution units other than the cluster of the two or more clusters of execution units containing the execution unit which generated at least one of those last awaited source operands.

2. The circuitry of claim 1, in which the scheduler circuitry is configured to associate readiness data, indicating readiness for issue, with a queued processing instruction for which all of the source operands are available, the instruction picker circuitry being configured to select a queued processing instruction for which the readiness data indicates readiness for issue.

3. The circuitry of claim 2, in which the scheduler circuitry is configured to inhibit the picker circuitry associated with a cluster of the two or more clusters of execution units other than the cluster of the two or more clusters of execution units containing the execution unit which generated the last awaited one of the source operands from detecting the readiness data for the given queued processing instruction.

4. The circuitry of claim 3, in which the picker circuitry is configured to select a longest-queued or oldest processing instruction for which the readiness data indicates readiness for issue.

5. The circuitry of claim 1, in which the execution units comprise one or more execution stages configured to operate according to successive execution clock cycles.

6. The circuitry of claim 5, in which each given cluster of execution units comprises a first data path configured to transfer an operand generated by an execution unit of that cluster during a given clock cycle to an input of all execution units of the given cluster of execution units, the first data path having a first data path latency between generation of the operand and completion of transfer of the operand to the input of all execution units of the given cluster.

7. The circuitry of claim 6, in which the first data path latency is such that an execution unit of the given cluster may execute a processing instruction requiring an operand transferred by the first data path during a next following clock cycle after the given clock cycle.

8. The circuitry of claim 6, in which the two or more clusters of execution units comprise a second data path configured to transfer an operand generated by an execution unit during a given clock cycle to an input of all execution units of the two or more clusters of execution units, the second data path having a second data path latency between generation of the operand and completion of transfer of the operand to the input of all execution units of the two or more clusters of execution units.

9. The circuitry of claim 8, in which the second data path latency is longer than the first data path latency.

10. The circuitry of claim 9, in which the second data path comprises one or more processor registers configured to store operands generated by an execution unit.

11. The circuitry of claim 9, in which the second data path latency is such that an execution unit of the given cluster may execute a processing instruction requiring an operand transferred by the second data path no earlier than at least two clock cycles after the given clock cycle.

12. The circuitry of claim 9, in which the scheduler circuitry is configured to inhibit issue of the given queued processing instruction to an execution unit in a cluster of execution units other than the cluster of execution units containing the execution unit which generated that last awaited one of the source operands, until at least a predetermined non-zero number of clock cycles after receipt of the indication of availability of that last awaited one of the source operands.

13. The circuitry of claim 12, in which the scheduler circuitry is configured to generate a data mask to inhibit detection that the given queued processing instruction is ready for issue to an execution unit in a cluster of execution units other than the cluster of execution units containing the execution unit which generated that last awaited one of the source operands.

14. The circuitry of claim 13, in which the scheduler circuitry is configured to remove the data mask a predetermined number of clock cycles after generation of the last awaited one of the source operands.

15. The circuitry of claim 1, in which at least some of the two or more clusters of execution units comprises two or more execution units to execute processing instructions.

16. The circuitry of claim 1, in which one of (i) the scheduler circuitry and (ii) an execution unit generating the given operand is configured to provide the indication of the availability of the given operand as a source operand for use in execution of queued processing instructions.

17. A method comprising:

maintaining two or more queues of processing instructions;

selecting, from a respective queue of the two or more queues, respective queued processing instructions for issue to execution units of two or more clusters of execution units for execution;

selecting, from another respective queue of the two or more queues, respective queued processing instructions for issue to execution units of the two or more clusters of execution units for execution;

maintaining dependency data associated with each queued processing instruction, the dependency data for a queued processing instruction indicating any source operands which are required to be available for use in execution of that queued processing instruction;

inhibiting issue of that queued processing instruction until all of the required source operands for that queued processing instruction are available;

providing an indication of the availability of a given operand as a source operand for use in execution of queued processing instructions;

in response to an indication of availability of one or more last awaited source operands for a given queued processing instruction, inhibiting for at least one clock cycle selection of the given queued processing instruction for issue to an execution unit in a cluster of the two or more clusters of execution units other than a cluster of the two or more clusters of execution units containing an execution unit which generated those last awaited source operands;

in response to completion of the at least one clock cycle, enabling selection by the picker circuitry of the given queued processing instruction for issue to the execution unit in the cluster of the two or more clusters of execution units other than the cluster of the two or more clusters of execution units containing the execution unit which generated at least one of those last awaited source operands.

\* \* \* \* \*